United States Patent
Abrol et al.

(10) Patent No.: US 11,015,479 B2
(45) Date of Patent: May 25, 2021

(54) SYSTEMS AND METHODS FOR PREDICTING AN ANOMALY IN A COMBUSTOR

(71) Applicant: GENERAL ELECTRIC COMPANY, Schenectady, NY (US)

(72) Inventors: Sidharth Abrol, Karnataka (IN); Sangeeta Balram, Karnataka (IN); Prem Kumar Patchaikani, Karnataka (IN); Prabhanjana Kalya, Karnataka (IN)

(73) Assignee: General Electric Company, Schenectady, NY (US)

( * ) Notice: Subject to any disclaimer, the term of this patent is extended or adjusted under 35 U.S.C. 154(b) by 416 days.

(21) Appl. No.: 16/077,138

(22) PCT Filed: Feb. 1, 2017

(86) PCT No.: PCT/US2017/015973
§ 371 (c)(1),
(2) Date: Aug. 10, 2018

(87) PCT Pub. No.: WO2017/142707
PCT Pub. Date: Aug. 24, 2017

(65) Prior Publication Data
US 2019/0032510 A1    Jan. 31, 2019

(30) Foreign Application Priority Data
Feb. 15, 2016  (IN) .............................. 201641005251

(51) Int. Cl.
*F01D 21/00*  (2006.01)
*F23N 5/10*  (2006.01)
(Continued)

(52) U.S. Cl.
CPC .............. *F01D 21/003* (2013.01); *F02C 9/46* (2013.01); *F23N 5/10* (2013.01); *F23N 5/16* (2013.01);
(Continued)

(58) Field of Classification Search
CPC . F01D 21/003; F23N 5/10; F23N 5/16; F23N 5/242; F23N 2241/20; F23R 3/46;
(Continued)

(56) References Cited

U.S. PATENT DOCUMENTS 7,337,057 B2   2/2008  Norman et al.
7,451,601 B2   11/2008 Taware et al.
(Continued)

FOREIGN PATENT DOCUMENTS

WO   2015068176 A2   5/2015

OTHER PUBLICATIONS

Domen, Shohie, et al., Detection and Prevention of Blowout in a Lean Premixed Gas-Turbine Model Combustor Using the Concept of Dynamical System Theory, Proceedings of the Combustion Institute, 35 (2015) 3245-3253 (Available Online Aug. 19, 2014). (Year: 2014).*

(Continued)

*Primary Examiner* — Alexander Satanovsky
*Assistant Examiner* — Mark I Crohn
(74) *Attorney, Agent, or Firm* — James W. Pemrick; Charlotte C. Wilson

(57) ABSTRACT

A method for predicting an anomaly in a combustor (16) is presented. The method includes receiving signals representative of parameters in one or more combustion cans (22, 24) of the combustor, generating a plurality of patterns based on a permutation entropy window and the signals, identifying a plurality of pattern categories in the plurality of patterns, determining a permutation entropy based on the plurality of (Continued)

patterns and the plurality of pattern categories, and predicting an anomaly in the combustor based on the permutation entropy. The method further includes comparing the plurality of pattern categories to determined permutations of pattern categories if the anomaly is present in the combustor, and predicting a category of the anomaly based on the comparison of the plurality of pattern categories to the determined permutations of pattern categories.

29 Claims, 9 Drawing Sheets

(51) Int. Cl.
      *F23N 5/16*       (2006.01)
      *F23N 5/24*       (2006.01)
      *F23R 3/46*       (2006.01)
      *F02C 9/46*       (2006.01)

(52) U.S. Cl.
      CPC ............... *F23N 5/242* (2013.01); *F23R 3/46* (2013.01); *F05D 2260/80* (2013.01); *F05D 2260/82* (2013.01); *F23N 2241/20* (2020.01); *F23R 2900/00013* (2013.01)

(58) Field of Classification Search
      CPC .............. F23R 2900/00013; F02C 9/46; F05D 2260/80; F05D 2260/82
      See application file for complete search history.

(56) References Cited

U.S. PATENT DOCUMENTS

| | | | |
|---|---|---|---|
| 7,454,892 B2 | 11/2008 | Lieuwen et al. | |
| 7,743,599 B2 | 6/2010 | Taware et al. | |
| 7,853,433 B2 | 12/2010 | He et al. | |
| 7,966,801 B2 | 6/2011 | Umeh et al. | |
| 8,607,575 B2 | 12/2013 | Myers, Jr. et al. | |
| 8,899,049 B2 | 12/2014 | Krull et al. | |
| 2010/0076698 A1 | 3/2010 | He et al. | |
| 2014/0121998 A1 | 5/2014 | Krull et al. | |
| 2015/0027211 A1* | 1/2015 | Claussen | F23M 11/045 73/112.01 |
| 2015/0168228 A1 | 6/2015 | Desilva | |

OTHER PUBLICATIONS

Muruganandam et al., "Active Control of Lean Blowout for Turbine Engine Combustors", Journal of Propulsion and Power, vol. 21, Issue: 5, pp. 807-814, 2005.

Aditya et al., "Detection of Precursor Event Before Blowout in a Gas Turbine Type Combustor at Atmospheric Pressure", ASME 2012 Gas Turbine India Conference, pp. 453-460, Dec. 1, 2012, Mumbai, Maharashtra, India.

Domen et al., "Detection and prevention of blowout in a lean premixed gas-turbine model combustor using the concept of dynamical system theory", Proceedings of the Combustion Institute, vol. 35, Issue: 3, pp. 3245-3253, 2015.

Weiying Wang et. al: "Fault Detection and Diagnosis for Gas Turbines Based on a Kernelized Information Entropy Model", The Scientific World Journal, vol. 2014, Jan. 1, 2014 pp. 1-13.

International Search Report and Written Opinion dated May 12, 2017 which was issued in connection with PCT No. PCT/US17/15973 which was filed on Feb. 1, 2017.

* cited by examiner

SYSTEMS AND METHODS FOR PREDICTING AN ANOMALY IN A COMBUSTOR

BACKGROUND

Embodiments of the present specification generally relate to industrial gas turbines, and more specifically to a method and system for predicting an anomaly in a combustor.

Industrial gas turbines are often used to provide power to drive an electrical generator. Other types of gas turbines may be used as aircraft engines, on-site and supplemental power generators, and for other applications. Gas turbines generally include a compressor and a turbine arranged on rotating shaft(s), and a combustor disposed between the compressor and turbine. The combustor includes one or more combustion cans that receive compressed air from the compressor and liquid and/or gaseous fuel from a fuel source. The combustion cans burn a mixture of the compressed air and the fuel to generate a high-energy combustion gas stream that drives the turbine. The turbine rotationally drives the compressor and provides output power.

Typically, engines need to comply with regulatory emission requirements of a host country. For example, it is desirable to maintain an amount of nitrous oxide, carbon monoxide and particulate matter emitted out of an engine within predefined limits. A fuel-air ratio in the combustion cans is a primary factor affecting emissions. Hence, fuel and air flow rates are controlled not only for ignition of a flame in the combustion cans but also for clean emissions after ignition. Generally, a turbine controller controls the fuel-air ratio in the combustion cans by increasing or decreasing the air mass flow rate relative to the fuel mass flow rate.

While the fuel-air ratio is controlled for clean emissions, the fuel-air ratio is additionally controlled to prevent occurrence of various anomalies in the combustion cans such as a lean blowout (LBO), a rich blowout (RBO), and other instabilities in the combustor. For example, an exceptionally lean fuel-air ratio (when the amount of air is inappropriately high in comparison to the amount of fuel) may result in a lean blowout. Similarly, an exceptionally rich fuel-air ratio may result in a rich blowout. In addition to the fuel-air ratio, other factors such as an unstable flame may result in the anomalies in the combustor. The anomalies result in tripping or shut down of the gas turbines, thereby resulting in unexpected and prolonged downtime with several other complications, such as maintenance scheduling challenges and loss of production.

BRIEF DESCRIPTION

In accordance with aspects of the present specification, a method for predicting an anomaly in a combustor is presented. The method includes receiving, by a processing subsystem, signals representative of parameters in one or more combustion cans of the combustor, generating, by the processing subsystem, a plurality of patterns based on a permutation entropy window and the signals, identifying, by the processing subsystem, a plurality of pattern categories in the plurality of patterns, determining, by the processing subsystem, a permutation entropy based on the plurality of patterns and the plurality of pattern categories, and predicting, by the processing subsystem, an anomaly in the combustor based on the permutation entropy. The method further includes comparing, by the processing subsystem, the plurality of pattern categories to determined permutations of pattern categories if the anomaly is present in the combustor, and predicting a category of the anomaly, by the processing subsystem, based on the comparison of the plurality of pattern categories to the determined permutations of pattern categories.

In accordance with another aspect of the present specification, a system for predicting an anomaly in a combustor is presented. The system includes one or more sensing devices disposed on one or more combustion cans of the combustor and configured to generate sensor-signals representative of parameters in the one or more combustion cans of the combustor. The system further includes a processing subsystem operatively coupled to the one or more sensing devices and configured to pre-process the sensor-signals representative of parameters in the one or more combustion cans to generate pre-processed signals, generate a plurality of patterns based on a permutation entropy window and the pre-processed signals, identify a plurality of pattern categories in the plurality of patterns, determine a permutation entropy based on the plurality of patterns and the plurality of pattern categories, and predict an anomaly in the combustor based on the permutation entropy. The processing subsystem is further configured to compare the plurality of pattern categories to determined permutations of pattern categories if the anomaly is present, and predict a category of the anomaly in the combustor based on the comparison of the plurality of pattern categories to the determined permutations of pattern categories.

In accordance with yet another aspect of the present specification, a system for predicting an anomaly in a combustor is presented. The system includes a gas turbine including a combustor, wherein the combustor includes one or more combustion cans, and one or more sensing devices disposed on the one or more combustion cans. The sensing devices are configured to generate sensor-signals representative of parameters in the one or more combustion cans of the combustor. The system further includes a processing subsystem operatively coupled to the one or more sensing devices and configured to pre-process the sensor-signals representative of parameters in the one or more combustion cans to generate pre-processed signals, generate a plurality of patterns based on a permutation entropy window and the pre-processed signals, identify a plurality of pattern categories in the plurality of patterns, determine a permutation entropy based on the plurality of patterns and the plurality of pattern categories, and predict an anomaly in the combustor based on the permutation entropy. The processing subsystem is additionally configured to compare the plurality of pattern categories to determined permutations of pattern categories if the anomaly is present, and predict a category of the anomaly in the combustor based on the comparison of the plurality of pattern categories to the determined permutations of pattern categories.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art to which this disclosure belongs. The terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "control system" or "controller" may include either a single component or a plurality of components, which are either active and/or passive and are connected or otherwise coupled together to provide the described function or functions.

Figure 1:
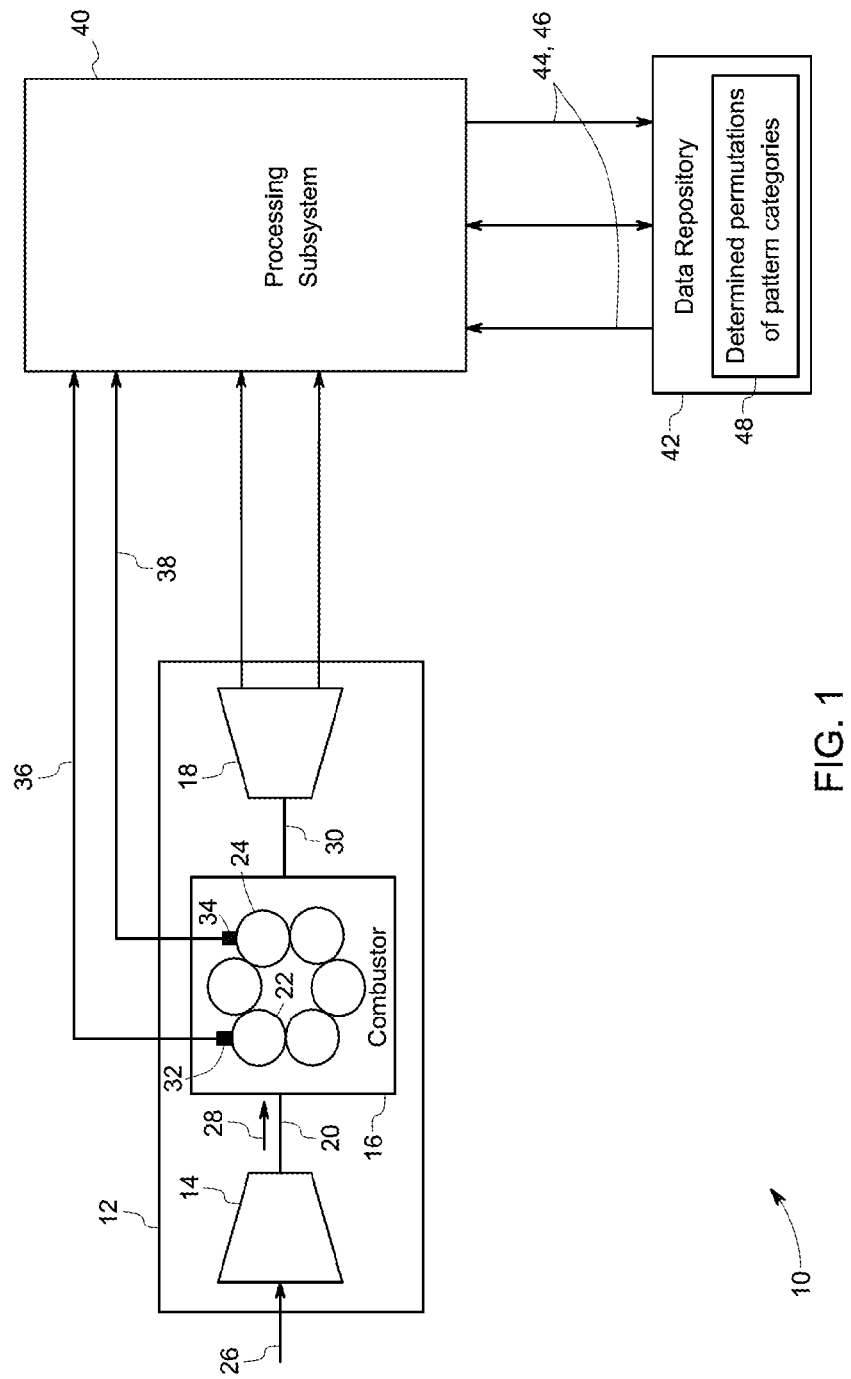
FIG. 1 is one embodiment of a block diagram of a gas turbine system for predicting an anomaly in a combustor, in accordance with aspects of the present specification.

FIG. 1 is one embodiment of a block diagram of a gas turbine system 10 for predicting an anomaly in a combustor 16, in accordance with aspects of the present specification. The gas turbine system 10 includes a gas turbine 12 and a processing subsystem 40. The gas turbine 10 is operationally coupled to the processing subsystem 40. As shown in FIG. 1, the gas turbine 12 includes a compressor 14, the combustor 16, and a turbine 18 disposed around a shaft 20. The combustor 16 includes a plurality of combustion cans. For ease of illustration, in the example of FIG. 1, the combustor 16 is depicted as including six combustion cans. However, use of a higher or lower number of combustor cans in the combustor 16 is also envisaged. By way of example, the number of combustion cans may be equal to or greater than twelve. In one embodiment, the six combustion cans may be arranged annularly.

Additionally, for ease of understanding, and the systems and methods for predicting an anomaly in the combustor 16 are described with reference to a first combustion can 22 and a second combustion can 24. It may be noted that the methods of predicting an anomaly in the combustor 16 are applicable to the rest of the combustion cans in the combustor 16. Also, for ease of understanding, in the embodiment of FIG. 1, the gas turbine 12 is shown as including three components such as the compressor 14, the combustor 16 and the turbine 18. It may be noted that the gas turbine 12 may include additional components.

In operation, ambient air 26 is channeled into the compressor 14. It may be noted that the ambient air 26 is compressed to a pressure greater than an ambient pressure used to produce compressed air 28. The compressed air 28 is then channeled into the combustor 16. Moreover, the compressed air 28 and a fuel (not shown) are combined in the combustor 16 and combusted to produce a relatively high-velocity gas 30. In one embodiment, the combination of the compressed air 28 and the fuel may be combusted in the combustion cans 22, 24. The turbine 18 extracts energy from the high-velocity gas 30 discharged from the combustor 16. An example of a gas turbine is shown with reference to FIG. 2.

In a presently contemplated configuration, the gas turbine system 10 may include one or more sensing devices 32, 34 configured to generate sensor-signals 36, 38 representative of parameters in the combustion cans 24, 26 of the combustor 16. In one embodiment, the sensing devices 32, 34 may be disposed on the combustion cans 22, 24 of the combustor 16. Moreover, in certain embodiments, each of the sensing devices may be disposed on a corresponding combustion can. For example, as depicted in FIG. 1, the first sensing device 32 is disposed on the first combustion can 22 and the second sensing device 34 is disposed on the second combustion can 24. It may be noted that for ease of illustration, the gas turbine system 10 is shown as including two sensing devices 32, 34, where a single sensing device is disposed on a corresponding combustion can 22, 24. However, more than one sensing device may be disposed on each of the combustion cans of the combustor 16. The sensing devices 32, 34, for example, may include an acoustic sensor, a pressure sensor, a vibration sensor, a piezoelectric sensor, a temperature sensor, a flame intensity sensor, and the like.

As noted hereinabove, the sensing devices 32, 34 are configured to generate sensor-signals 36, 38 that are representative of parameters in the combustion cans 24, 26. In the presently contemplated configuration, the first sensing device 32 generates a first sensor-signal 36 and the second sensing device 34 generates a second sensor-signal 38. The parameters, for example, may include pressure, dynamic pressure, temperature, flame intensity, and the like. Accordingly, by way of a non-limiting example, the first sensor-signal 36 may be representative of a dynamic pressure inside the first combustion can 22 and the second sensor-signal 38 may be representative of a dynamic pressure inside the second combustion can 24.

The gas turbine system 10 further includes the processing-subsystem 40 and a data repository 42. In one embodiment, the processing subsystem 40 is operationally coupled to the sensing devices 32, 34, the gas-turbine 12 and the data repository 42. The processing subsystem 40 receives the sensor-signals 36, 38 from the sensing devices 32, 34. In one embodiment, the processing subsystem 40 may process the sensor-signals 36, 38 to generate pre-processed signals 44, 46. For example, the processing subsystem 40 may process the first sensor-signal 36 to generate the first pre-processed signal 44. Similarly, the processing subsystem 40 may process the second sensor-signal 38 to generate the second pre-processed signal 46. The generation of the pre-processed signals 44, 46 by the processing subsystem 40 will be described in greater detail with reference to FIG. 5.

In one embodiment, the processing subsystem 40 may store the pre-processed signals 44, 46 in the data repository 42. Additionally, the processing subsystem 40 may be configured to retrieve the pre-processed signals 44, 46 from the data repository 42 for further processing. It may be noted that the pre-processed signals 44, 46 are representative of the parameters in the combustion cans 22, 24. Particularly, the first pre-processed signal 44 is representative of the parameters in the first combustion can 22, and the second pre-processed signal 46 is representative of the parameters in the second combustion can 24.

The processing subsystem 40 is further configured to generate a plurality of patterns based on a permutation entropy window and signals. As used herein, the term "permutation entropy window" is used to refer to a virtual window that is characterized by an embedding dimension. Furthermore, the permutation entropy window is used to select a subset of data from a signal such that the subset of the data is characterized by a length equal to the embedding dimension. The embedding dimension, for example, may include a determined number of time stamps or a determined number of samples.

Furthermore, the signals, for example may include the sensor-signals 36, 38, the pre-processed signals 44, 46, or a combination thereof. Also, the processing subsystem 40 is configured to generate a plurality of patterns based on the permutation entropy window and signals. The signals, for example may include the sensor-signals 36, 38 and/or the pre-processed signals 44, 46. The processing subsystem 40 may be further configured to identify a plurality of pattern categories in the patterns. The generation of the patterns and identification of the pattern categories will be described in greater detail with reference to FIG. 6, FIG. 7A, and FIG. 7B.

In certain embodiments, the processing subsystem 40 may be configured to determine a permutation entropy or a weighted permutation entropy based on the patterns and pattern categories. Furthermore, the processing subsystem 40 may be configured to predict the anomaly in the combustor 16 based on the permutation entropy or the weighted permutation entropy. The determination of the permutation entropy will be described in greater detail with reference to FIG. 8. Also, the determination of the weighted permutation entropy will be described in greater detail with reference to FIG. 9.

In situations where presence of an anomaly in the combustor 16 is predicted by the processing subsystem 40, the processing subsystem 40 is further configured to compare the pattern categories to determined permutations 48 of pattern categories. The processing subsystem 40, for example, may retrieve the determined permutations 48 of pattern categories from the data repository 42. In certain embodiments, the determined permutations 48 of pattern categories may be stored in the data repository 42 by a user before or after commissioning of the gas turbine system 10.

In accordance with aspects of the present specification, the processing subsystem 40 may predict a category of the anomaly in the combustor 16 based on the comparison of the pattern categories with the determined permutations 48 of pattern categories. The category of the anomaly in the combustor 16, for example, may include a lean blowout (LBO) event, a rich blowout (RBO) event, an instability in the combustor 16, or combinations thereof. Examples of the determined permutations 48 of pattern categories and the comparison of the pattern categories with the determined permutations 48 of pattern categories will be described in greater detail with reference to FIG. 8.

The processing subsystem 40 may include at least one arithmetic logic unit, microprocessor, general purpose controller or other processor arrays configured to perform computations, and/or retrieve data stored in memory and/or the data repository 42. In one embodiment, the processing subsystem 40 may be a multiple core processor. The processing subsystem 40 processes data signals and may include various computing architectures including a complex instruction set computer (CISC) architecture, a reduced instruction set computer (RISC) architecture, or an architecture implementing a combination of instruction sets. In one embodiment, the processing capability of the processing subsystem 40 may support the retrieval of data and transmission of data. In another embodiment, the processing capability of the processing subsystem 40 may also perform more complex tasks, including various types of feature extraction, modulating, encoding, multiplexing, and the like. Use of other types of processors, operating systems, and physical configurations is also envisioned.

Figure 2:
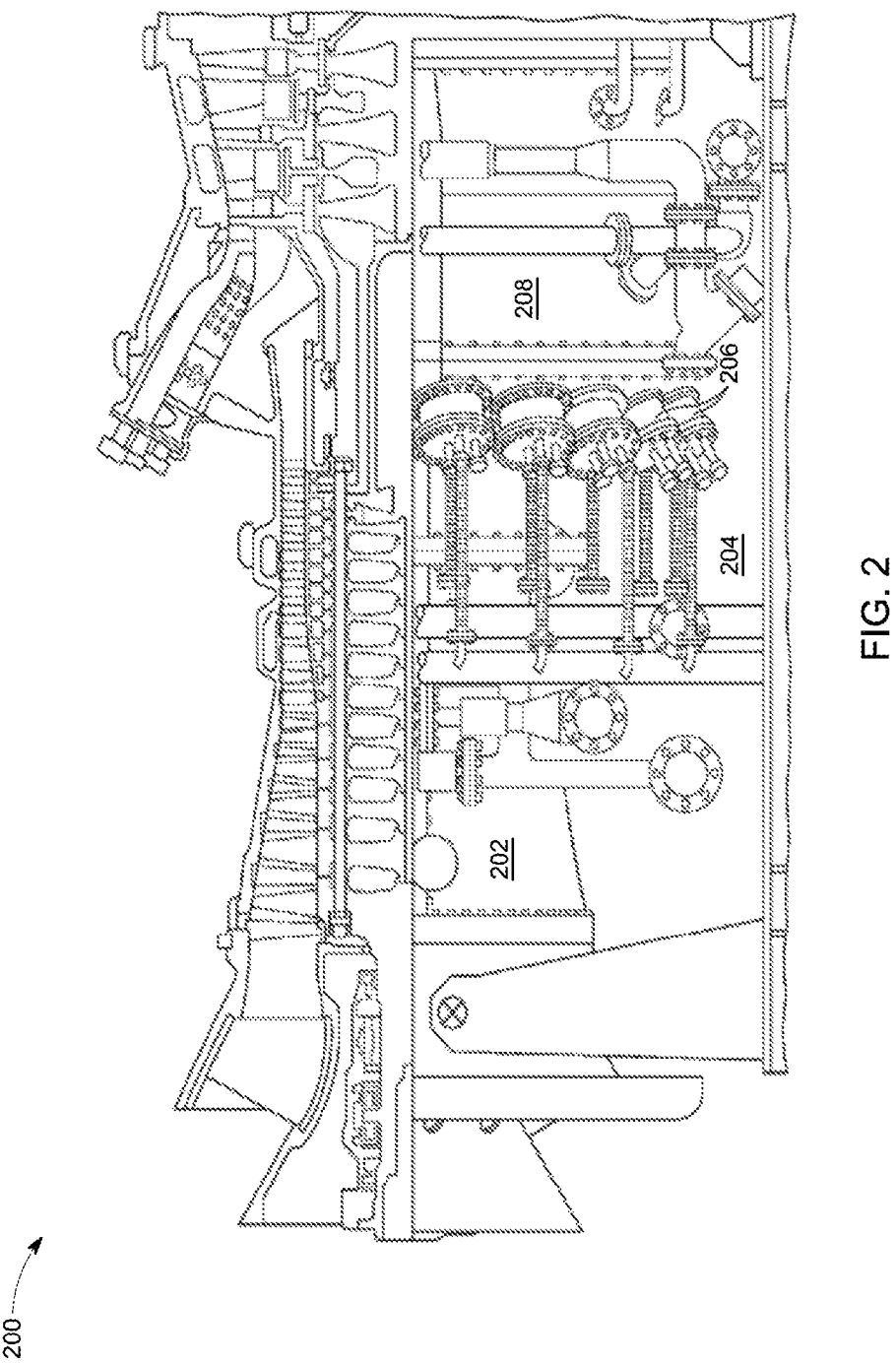
FIG. 2 is a side cut way view of the gas turbine of FIG. 1, in accordance with aspects of the present specification.

FIG. 2 is a side cutaway view of a gas turbine 200, in accordance with aspects of the present specification. The gas turbine 200, for example, may be the gas turbine 12 of FIG. 1. The gas turbine 200 includes a compressor 202, a combustor 204 including a plurality of combustion cans 206, and a turbine 208 coupled to the compressor 202 using a shaft (not shown). By way of example, the compressor 202 may be the compressor 14, the combustor 204 may be the combustor 16, the turbine 208 may be the turbine 18, and the combustion cans 206 may be the combustion cans 22, 24 of FIG. 1.

Figure 3:
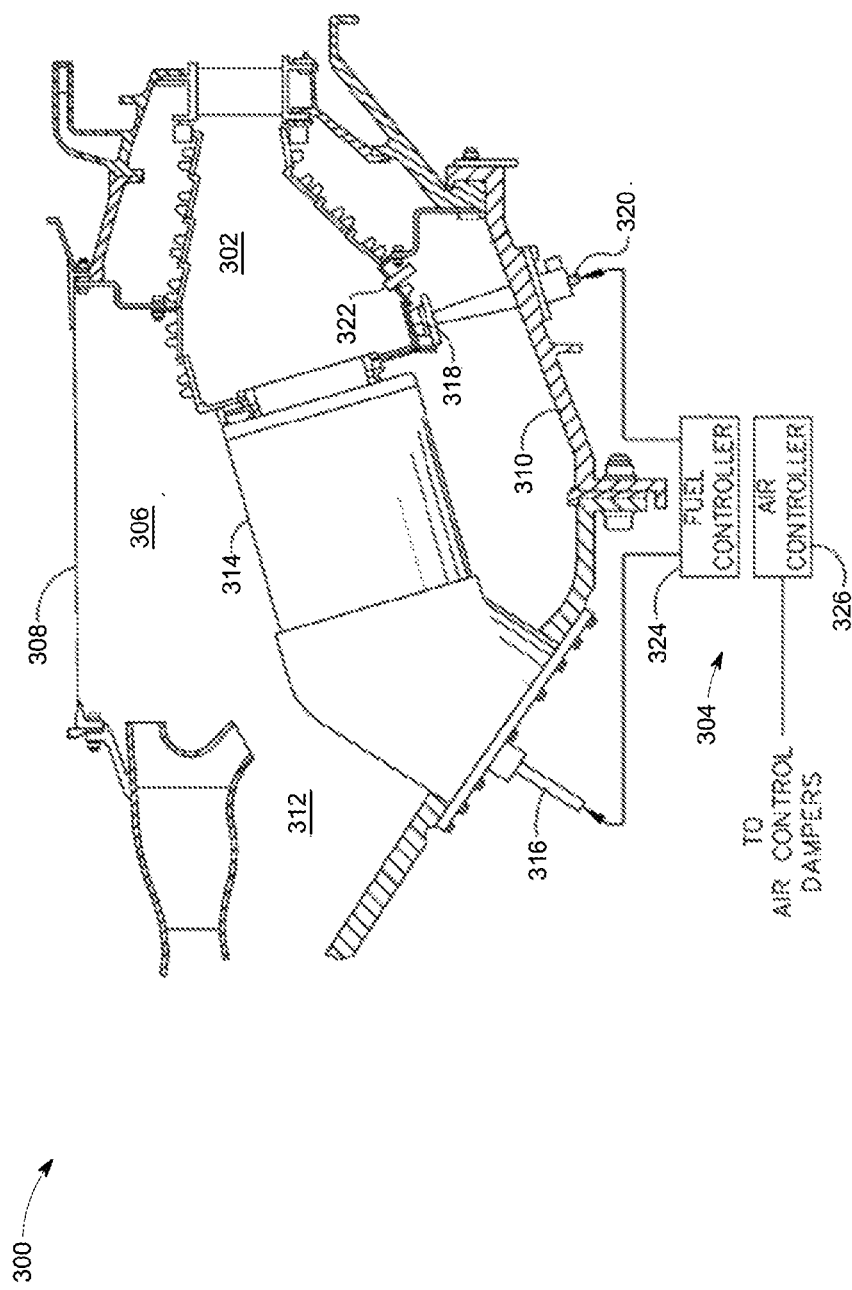
FIG. 3 is a schematic representation of a cross section of an example of a combustor for use in the gas turbine of FIGS. 1-2, in accordance with aspects of the present specification.

FIG. 3 is a schematic representation 300 of a cross-section of one embodiment of a combustor configured for use in the gas turbine of FIGS. 1-2. Reference numeral 302 is generally representative of a combustion can and a portion of a gas turbine control system is represented by reference numeral 304.

In the example of FIG. 3, the combustion can 302 is an annular combustion can and may be positioned within an annulus 306 between an inner engine casing 308 and an outer engine case 310. A diffuser 312 leads axially into the annulus 306 from a compressor (not shown). The combustion can 302 discharges to a turbine (not shown). Moreover, the combustor 300 includes a plurality of main fuel nozzles 314 that is spaced circumferentially with respect to each other within the annulus 306. The main nozzles 314 are configured to premix a fuel with a portion of the air exiting the diffuser 312 and supply the fuel and air mixture to the combustion can 302. For ease of illustration only one of the main nozzles 314 is shown in FIG. 3.

Furthermore, a plurality of main fuel supply conduits 316 supplies fuel to the main fuel nozzles 314. In addition, a plurality of pilot fuel nozzles 318 supplies the pilot fuel to the combustion can 302. Also, a plurality of pilot fuel supply conduits 320 is configured to distribute fuel to the pilot fuel nozzles 318. A plurality of igniters (not shown) may be positioned within the vicinity of the pilot fuel nozzles 318 to ignite the fuel supplied to pilot fuel nozzles 318.

Moreover, a combustion sensor 322 may be positioned within the combustion can 302 to monitor pressure and/or flame fluctuations therein. The combustion sensor 322 transmits signals indicative of combustion conditions within the combustion can 302 to the gas turbine engine control system 304. The gas turbine engine control system 304 is communicatively coupled to a fuel controller 324. Further, the fuel controller 324 is configured to adjust flow rates of the pilot fuel and the main fuel to the combustion can 302. Also, the combustor 300 includes an air controller 326 configured to control an engine air control damper (not shown).

Figure 4:
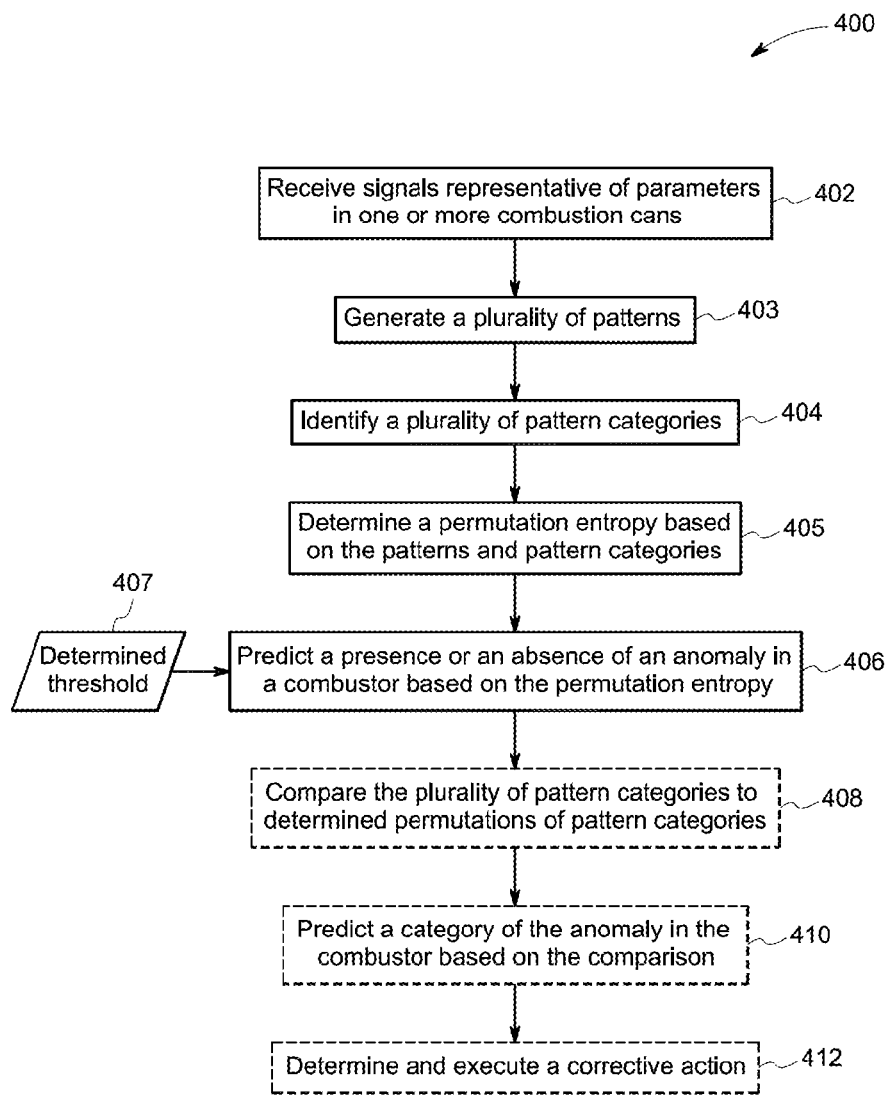
FIG. 4 is a flow chart of a method for predicting an anomaly in a combustor, in accordance with aspects of the present specification.

FIG. 4 is a flow chart of a method 400 for predicting an anomaly in a combustor, in accordance with aspects of the present specification. The combustor, for example may be the combustor 16 (see FIG. 1). Also, some examples of the anomaly include, but are not limited to, a lean blowout event, a rich blowout event, an instability in the combustor, and the like. As previously noted, the combustor may include one or more combustion cans. Accordingly, in one embodiment, the method 400 may be separately executed for each combustion can in the combustor. For example, the method 400 may be executed for the first combustion can 22 using the sensor-signal 36, and the method 400 may also be separately executed for the second combustion can 24 using the sensor-signal 38. The method 400 of FIG. 4 is described with reference to the elements of FIGS. 1-3.

At block 402, signals representative of parameters in the combustion cans may be received. The signals may be sensor-signals, pre-processed signals, or a combination thereof. Also, the parameters, for example, may include a pressure, a dynamic pressure, temperature, flame intensity, and the like.

In one example, the signals may be sensor-signals 36, 38 generated by the sensing devices 32, 34 that are disposed on the combustion cans 22, 24. Furthermore, these sensor-signals 36, 38 may be received by the processing subsystem 40 from the sensing devices 32, 34 disposed on the combustion cans 22, 24.

Moreover, in another example, the signals are pre-processed signals. These pre-processed signals are generated by processing the sensor-signals 36, 38. In this example, the pre-processed signals may be received by the processing subsystem 40 from the data repository 42. Generation of the pre-processed signals based on the sensor-signals will be described in greater detail with reference to FIG. 5.

At block 403, a plurality of patterns may be generated based on a permutation entropy window and the signals. Generation of the patterns will be described in greater detail with reference to FIG. 7A and FIG. 7B. In addition, at block 404, a plurality of pattern categories in the patterns may be identified. Identification of the pattern categories in the patterns will be described in greater detail with reference to FIGS. 6, 7A, and 7B.

Subsequently at block 405, a permutation entropy may be determined based on the patterns and the pattern categories. In one embodiment, the permutation entropy may be a weighted permutation entropy. Determination of the permutation entropy will be described in greater detail with reference to FIG. 8. Also, determination of the weighted permutation entropy will be described in greater detail with reference to FIG. 9.

Furthermore, at block 406, a presence or absence of the anomaly in the combustor may be predicted based on the permutation entropy or the weighted permutation entropy. Particularly, presence of any anomaly in the combustor may be predicted based on the permutation entropy and a determined threshold 407. As used herein, the term "determined threshold" is a numerical value that may be used to determine 'a presence or an absence of an anomaly in a combustor. The determined threshold 407, for example, may be a function of operating conditions of a gas turbine that includes the combustor, such as a compressor inlet pressure, an inlet guide vane reference, and the like. In one example, the permutation entropy may be compared with the determined threshold 407 to predict the presence of the anomaly in the combustor.

At block 406, if the presence of the anomaly is predicted, then at block 408, the pattern categories identified at step 404 may be compared to determined permutations of pattern categories. The determined permutations of pattern categories may be the determined permutations 48 of pattern categories (see FIG. 1). For ease of understanding, three examples of determined permutations of pattern categories are depicted in Table 1.

Furthermore, at block 410, a category of the anomaly may be predicted based on the comparison of the pattern categories to the determined permutations of pattern categories. As previously noted, the category of the anomaly, for example may include a lean blowout (LBO) event, a rich blowout (RBO) event, an instability in the combustor 16, and the like. An example of the determination of the determined permutations of pattern categories and determination of the category of the anomaly in the combustor is explained in greater detail with reference to Table 1.

TABLE 1

| Anomaly Present | Pattern categories | | | | | |
|---|---|---|---|---|---|---|
| | (1, 2, 3) | (1, 3, 2) | (2, 1, 3) | (2, 3, 1) | (3, 1, 2) | (3, 2, 1) |
| LBO | ● | ● | ● | | | |
| RBO | ● | ● | | | | |
| Other Combustion Instabilities | | | | ● | ● | ● |

A first row of the Table 1 includes a first determined permutation of pattern categories. The first permutation of pattern categories includes pattern categories such as (1, 2, 3), (1, 3, 2) and (2, 1, 3). It may be noted that the first permutation of pattern categories does not include pattern categories, such as (2, 3, 1), (3, 1, 2) and (3, 2, 1). As depicted in the first row of Table 1, a presence of each of the pattern categories including (1, 2, 3), (1, 3, 2), (2, 1, 3) and an absence of the pattern categories (2, 3, 1), (3, 1, 2) and (3, 2, 1) is indicative of a lean blowout anomaly in the combustor.

Furthermore, a second row of the Table 1 includes a second determined permutation of pattern categories. The second permutation of pattern categories includes pattern categories such as (1, 2, 3) and (1, 3, 2). It may also be noted that the second permutation of pattern categories does not include the pattern categories (2, 1, 3), (2, 3, 1), (3, 1, 2) and (3, 2, 1). In the example presented in the second row of Table 1, presence of the pattern categories including (1, 2, 3) and (1, 3, 2) and an absence of the pattern categories (2, 1, 3), (2, 3, 1), (3, 1, 2) and (3, 2, 1) is indicative of a presence of a rich blowout anomaly in the combustor.

With continuing reference to Table 1, a third row of the Table 1 includes a third determined permutation of pattern categories. The third permutation of pattern categories includes pattern categories such as (2, 3, 1), (3, 1, 2) and (3, 2, 1). However, the third permutation of pattern categories does not include the pattern categories (1, 2, 3), (1, 3, 2), and (2, 1, 3). In the example presented in the third row of Table 1, a presence of the pattern categories including (2, 3, 1), (3, 1, 2) and, (3, 2, 1), and an absence of the pattern categories (1, 2, 3), (1, 3, 2), and (2, 1, 3) is indicative of presence of other combustion anomalies in the combustor.

Subsequently, at block 412, a corrective action may be determined and executed to prevent the combustor from the predicted anomaly. The corrective action, for example, may include altering the fuel to air ratio in the combustion cans of the combustor, altering fuel splits in the combustion cans, and the like. It may be noted that in certain embodiments, blocks 408 to 412 may be representative of optional steps in the method 400. It may be noted that blocks 408 to 412 may be executed if the presence of an anomaly in the combustor is predicted at step 406. However, at step 406 if an absence of an anomaly in the combustor is predicted, blocks 408 to 412 may not be executed. In certain embodiments, if a presence or an absence of the anomaly is predicted in the combustor, then a user may be notified about the same.

Figure 5:
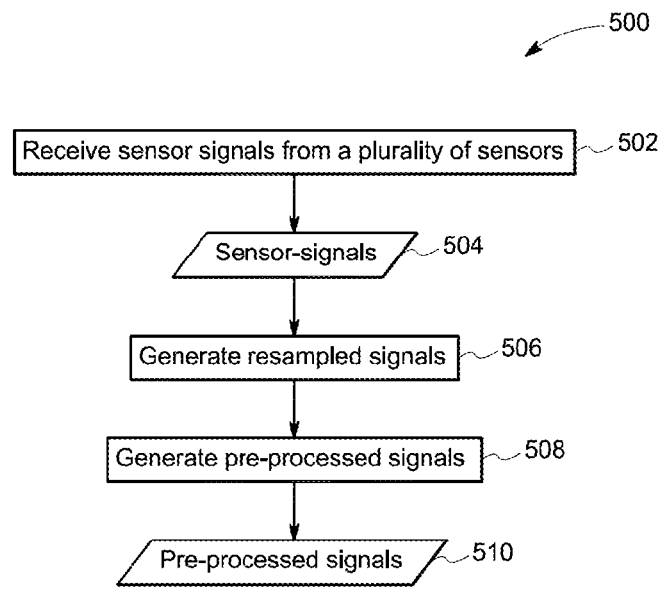
FIG. 5 is a flow chart of a method for generating pre-processed signals based on sensor-signals representative of parameters in one or more combustion cans, in accordance with aspects of the present specification.

As previously noted with reference to the step 402, in some embodiments, the pre-processed signals are generated by processing the sensor-signals 36, 38. Referring now to FIG. 5, a flow chart of a method 500 for generating pre-processed signals 510 based on sensor-signals 504, in accordance with aspects of the present specification, is presented. The method 500 of FIG. 5 is described with reference to the components of FIGS. 1-4.

At block 502, the sensor-signals 504 may be received from sensing devices 32, 34 disposed on the combustion cans 22, 24. Reference numeral 504 is representative of sensor-signals such as the sensor signals 36, 38 that are representative of parameters in the combustion cans 22, 24 in the combustor 16. It may be noted that in certain embodiments, each of the combustion cans 22, 24 may be representative of a standalone combustor. Moreover, in some embodiments, the sensor-signals 504 may be time series signals. By way of a non-limiting example, the sensor-signals 504 may be characterized by a frequency of about 12000 Hertz.

Furthermore, at block 506, the sensor-signals 504 may be de-trended and resampled to generate resampled signals. For example, during resampling, the sensor-signals 504 may be down-sampled to 5000 Hertz. Subsequently, at block 508, the resampled signals may be processed via a band-pass filter to generate pre-processed signals 510. The band pass filter, for example, may include an infinite or finite impulse response filter or a wavelet filter. By way of a non-limiting example, the pre-processed signals 510 may be characterized by a frequency in a range from about 5 hertz to about 240 hertz.

Figure 6:
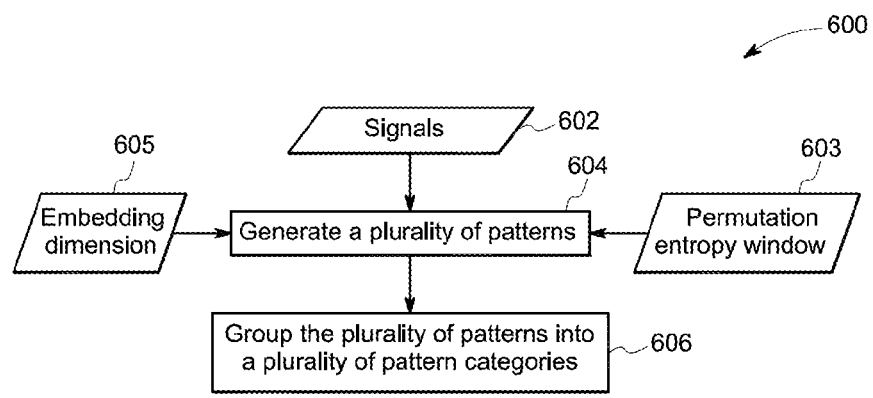
FIG. 6 is a flow chart of a method for identifying a plurality of pattern categories in patterns, in accordance with aspects of the present specification.

As previously noted with reference to block 404 of FIG. 4, a plurality of pattern categories may be identified in the patterns based on a permutation entropy window. Turning now to FIG. 6, a flow chart of a method 600 for identifying a plurality of pattern categories in patterns, in accordance with aspects of the present specification, is presented. The method 600 may be described with reference to the components of FIGS. 1-5.

Reference numeral 602 is representative of signals. The signals 602, for example may be sensor-signals or pre-processed signals. For example the signals 602, may be the sensor-signals 36, 38, 504 (see FIG. 1 and FIG. 5) or the pre-processed signals 510 (see FIG. 5). At block 604, a plurality of patterns may be generated based on a permutation entropy window 603 and the signals 602. The permutation entropy window 603, for example may be characterized by an embedding dimension 605. The embedding dimension 605, for example, may include a determined number of time stamps or a determined number of samples. Subsequently, at block 606, the plurality of patterns may be grouped into a respective plurality of pattern categories.

Generation of the patterns and identification of the pattern categories will be described in greater detail with reference to FIG. 7A and FIG. 7B.

Figure 7A:
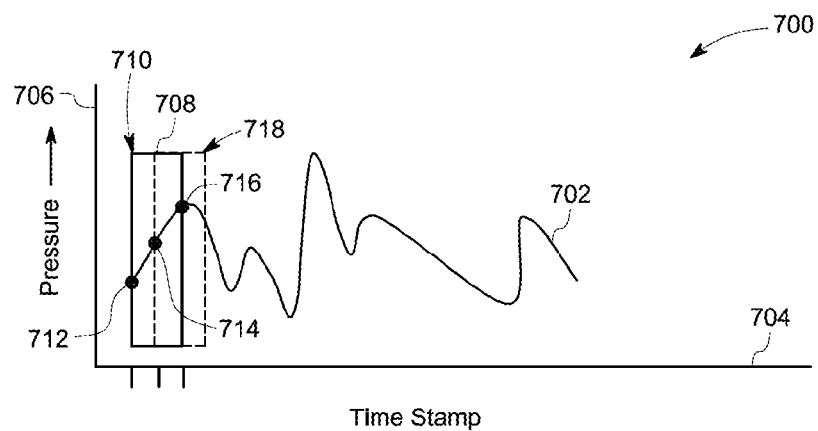
FIG. 7A depicts an example of a portion of a signal representative of parameters in one or more combustion cans, in accordance with aspects of the present specification.

FIG. 7A depicts a graphical representation 700 of an example of a portion of a signal 702 representative of parameters in a combustion can. Also, FIG. 7B depicts examples 720 of various potential pattern categories. It may be noted that these pattern categories may be generated via use of a permutation entropy window 708 characterized by an embedding dimension of three time stamps. The permutation window 708 may be used for generating patterns and identifying pattern categories, in accordance with aspects of the present specification. FIGS. 7A and 7B are described in terms of the components of FIGS. 1-6.

In the example of FIG. 7A, the signal 702 is shown for purposes of illustration. Other signals representative of parameters in combustions cans 22, 24 may also be used. In FIG. 7A, the signal 702 is representative of pressure in the combustion can 22.

Reference numeral 704 (X-axis) is representative of a time stamp. Also, reference numeral 706 (Y-axis) is representative of the pressure in the combustion can 22. Moreover, a permutation entropy window is represented by reference numeral 708. As previously noted, the term "permutation entropy window" is used to refer to a virtual window that is characterized by an embedding dimension and is used to select a subset of data from a signal such that the subset of the data is characterized by the embedding dimension. In the presently contemplated configuration, the permutation entropy window 708 is characterized by a length equal to an embedding dimension of three time stamps.

Figure 7B:
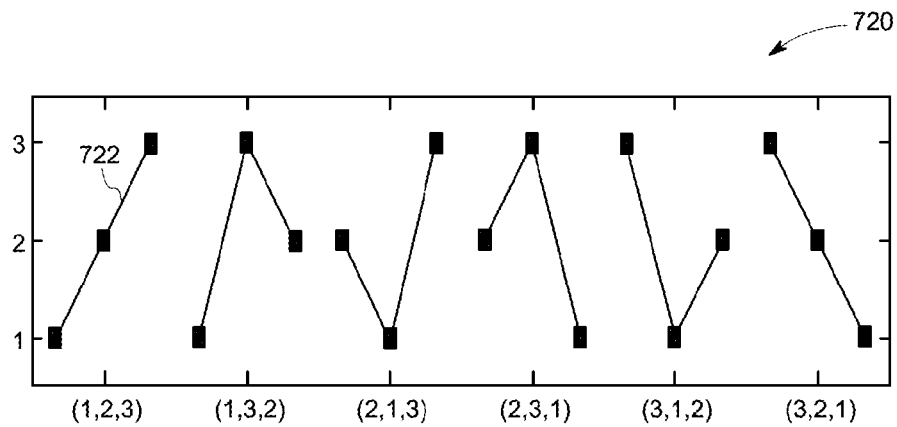
FIG. 7B depicts examples of various potential pattern categories, in accordance with aspects of the present specification.

When the permutation entropy window 708 is placed at a first position 710 on the signal 702, three data points 712, 714, 716 in a portion of the signal 702 that overlaps the permutation entropy window 708 are selected to form a first pattern 722 as shown in FIG. 7B. Thereafter, the permutation entropy window 708 may be shifted to a subsequent position 718. Three data points in a portion of the signal 702 that overlaps with the permutation entropy window 708 positioned at the subsequent position 718 may be selected to form a second pattern. In accordance with aspects of the present specification, the permutation entropy window 708 may be shifted along the signal 702 until each data point of the signal 702 forms a part of at least one pattern. Accordingly, multiple patterns may be generated by sliding the permutation entropy window 708 across the signal 702 as depicted in FIG. 7B.

Furthermore, the patterns may be grouped into pattern categories based on amplitudes of data points in the patterns. In the example of the first pattern 722 depicted in FIG. 7B, an amplitude of the second data point 714 is greater than an amplitude of the first data point 712 and an amplitude of the third data point 716 is greater than an amplitude of the second data point 714. Hence the first pattern 722 may be grouped into a pattern category (1, 2, 3). It may be noted that a pattern category may include one or more patterns where amplitudes of data points of all the patterns corresponding to that pattern category follow the same trend. For example, the pattern category (1, 2, 3) may include one or more patterns where amplitudes of second data points are greater than amplitudes of the respective first data points and amplitudes of third data points are greater than amplitudes of the respective second data points.

Figure 8:
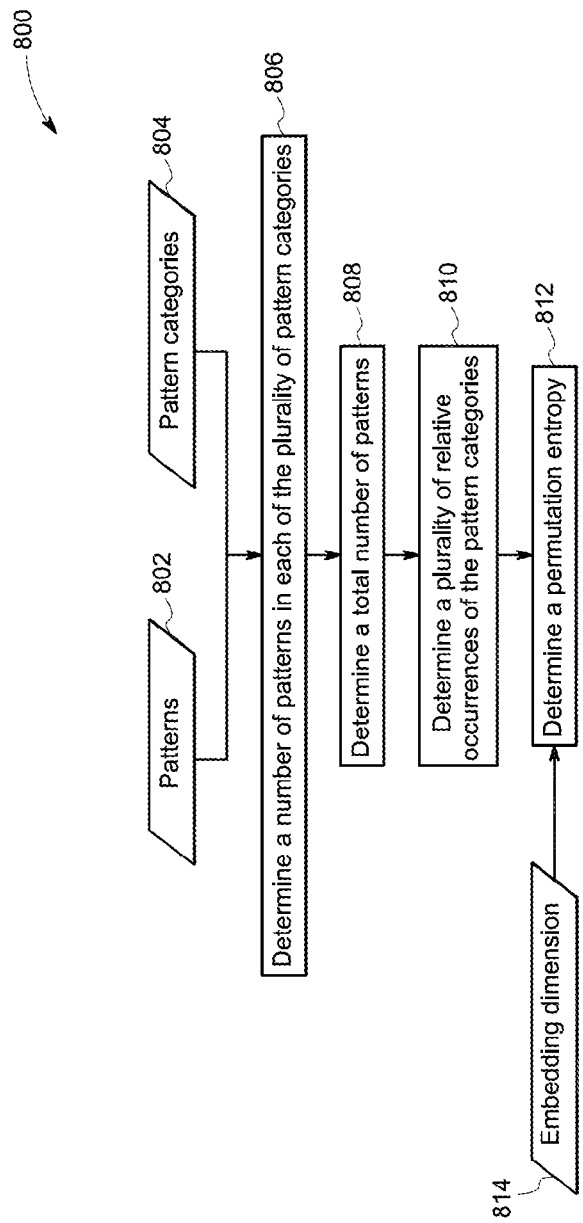
FIG. 8 is a flow chart of a method for determining a permutation entropy, in accordance with aspects of the present specification.

FIG. 8 is a flow chart of a method 800 for determining a permutation entropy, in accordance with aspects of the present specification. The method 800 may be described with reference to the elements of FIGS. 1-6, 7A, and 7B.

Reference numeral 802 is representative of patterns generated using a permutation entropy window and signals representative of parameters in one or more combustion cans of the combustor. For example, the patterns may be the patterns generated at block 604 in FIG. 6. In one embodiment, the patterns 802 may correspond to a single combustion can in the combustor. In another embodiment, the patterns may correspond to multiple combustion cans in the combustor.

Furthermore, reference numeral 804 is representative of pattern categories identified from the patterns 802. The pattern categories 804, for example, may be the pattern categories identified at block 606. In one embodiment, the pattern categories 804 may correspond to a single combustion can in the combustor. In another embodiment, the pattern categories may correspond to multiple combustion cans in the combustor.

Moreover, at block 806, a number of patterns in each of the pattern categories 804 may be determined. One example of the number of patterns in each of the pattern categories is depicted in Table 2.

TABLE 2

| Pattern category | Number of patterns in each pattern category |
|---|---|
| (1, 2, 3) | 20 |
| (1, 3, 2) | 25 |
| (2, 3, 1) | 40 |

Furthermore, at block 808, a total number of the patterns 802 may be determined. In one embodiment, if the patterns 802 correspond to multiple combustion cans in the combustor, then the total number of the patterns 802 includes patterns across multiple combustion cans in the combustor. In another embodiment, when the patterns 802 correspond to a single combustion can in the combustor, then the total number of the patterns 802 includes patterns corresponding to the single combustion can.

At block 810, a plurality of relative occurrences of the pattern categories may be determined. By way of a non-limiting example, the relative occurrences of the pattern categories may be determined based on the number of patterns in each of the pattern categories and the total number of patterns. Particularly, a relative occurrence corresponding to a pattern category may be determined based on a number of patterns in the pattern category and the total number of patterns. For example, a relative occurrence corresponding to a pattern category (1, 2, 3) may be determined based on a number of the pattern category (1, 2, 3) and the total number of patterns.

Subsequently, at block 812, a permutation entropy may be determined based on the relative occurrences of the pattern categories and an embedding dimension 814 of a permutation entropy window used for generating the patterns 802. The permutation entropy, for example, may be determined using a Shannon entropy method, a Renyi permutation entropy method, a permutation mini-entropy method, and the like. In one embodiment, the permutation entropy may be determined using equation (1):

$$h_p = \frac{\Sigma_\pi p(\pi) \log_2 p(\pi)}{\log_2 D!} \quad (1)$$

where $h_p$ is representative of a permutation entropy, $p(\pi)$ is representative of a relative occurrence of a pattern category and D is representative of an embedding dimension. In another embodiment, the permutation entropy may be determined using equation (2):

$$h_p(q) = \frac{\log_2(\Sigma_\pi p(\pi)^q)}{(1-q) \log_2 D!} \quad (2)$$

where $h_p(q)$ is representative of a permutation entropy, $p(\pi)$ is representative of a relative occurrence of a pattern category, q is representative of entropy order, and D is representative of an embedding dimension.

In still another embodiment, the permutation entropy may be determined using equation (3):

$$h_p(\infty) = \frac{-\log(\max p(\pi))}{\log_2 D!} \quad (3)$$

where $h_p(\infty)$ is representative of a permutation entropy, $p(\pi)$ is representative of a relative occurrence of a pattern category, and D is representative of an embedding dimension.

Figure 9:
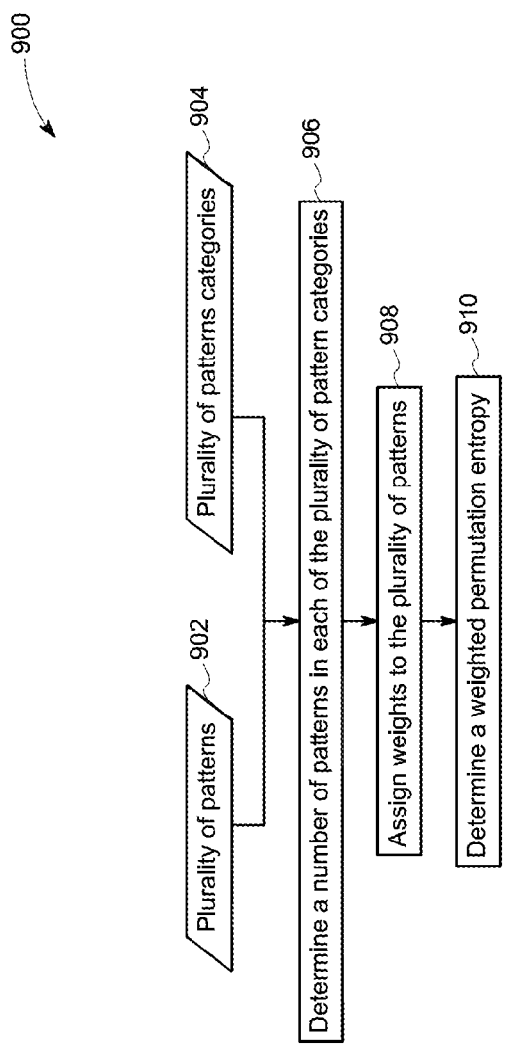
FIG. 9 is a flow chart of a method for determining a weighted permutation entropy, in accordance with aspects of the present specification.

FIG. 9 is a flow chart of a method 900 for determining a weighted permutation entropy, in accordance with aspects of the present specification. The method 900 may be described with reference to the elements of FIGS. 1-6, 7A, 7B and 8.

Reference numeral 902 is representative of patterns generated using a permutation entropy window and signals representative of parameters in one or more combustion cans. For example, the patterns may be the patterns generated at block 604 of FIG. 6. In one embodiment, the patterns 802 may correspond to a single combustion can in the combustor. In another embodiment, the patterns may correspond to multiple combustion cans in the combustor.

Furthermore, reference numeral 904 is representative of pattern categories identified from the patterns 902. The pattern categories 904, for example, may be the pattern categories identified at block 606. In one embodiment, the pattern categories 904 may correspond to a single combustion can in the combustor. In another embodiment, the pattern categories may correspond to multiple combustion cans in the combustor.

At block 906, a number of patterns in each of the pattern categories 904 may be determined. For example, if the pattern categories 904 include pattern categories such as (1, 2, 3), (1, 3, 2) and (2, 3, 1), then a number of patterns in each of the pattern categories (1, 2, 3), (1, 3, 2) and (2, 3, 1) may be determined. One example of the number of patterns in each of the pattern categories is shown in Table 2.

Furthermore, at block 908, weights may be assigned to the patterns 902 based on amplitudes of signals used for generating the patterns 902 and the pattern categories 904. An example of assignment of weights to the patterns 902 will be described in greater detail with reference to FIG. 10.

At block 910, the weighted permutation entropy may be determined based on the number of patterns in each of the pattern categories 904 and the weights assigned to the patterns 902. For example, the weighted permutation entropy may be determined using the equations (1) to (3) wherein the $p(\pi)$ is a function of the weights assigned to the patterns 902.

Figure 10:
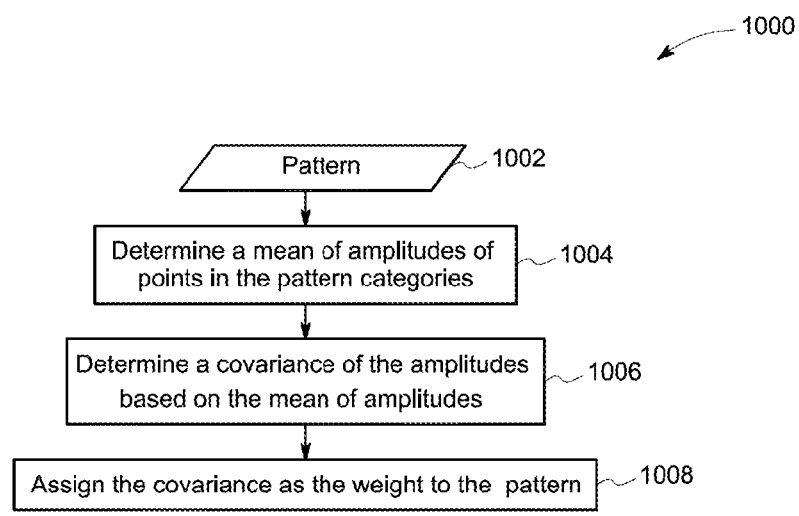
FIG. 10 is a flow chart of a method for assigning weights to a plurality of patterns, in accordance with aspects of the present specification.

FIG. 10 is a flow chart of a method 1000 for assigning a weight to a plurality of patterns, in accordance with aspects of the present specification. Reference numeral 1002 is representative of a pattern. The pattern 1002, for example, may be one of the patterns 720, 902, 802 of FIGS. 7B, 8 and 9 respectively. At block 1004, a mean of amplitudes of data points in the pattern 1002 may be determined. For example, if the pattern 1002 is the pattern 720, then the pattern 1002 includes data points 712, 714, 716 as shown in FIG. 7A. Accordingly, at block 1004, a mean of the amplitudes of the data points 712, 714, 716 may be determined. Furthermore, at block 1006, a covariance of the amplitudes of the data points may be determined based on the mean of the amplitudes of the data points. Additionally, at block 1008, the covariance may be assigned as a weight to the pattern 1002.

While only certain features of the invention have been illustrated and described herein, many modifications and changes will occur to those skilled in the art. It is, therefore, to be understood that the appended claims are intended to cover all such modifications and changes that fall within the true spirit of the invention.

The invention claimed is:

1. A method for predicting an anomaly in a combustor, comprising:
   receiving, by a processing subsystem, signals representative of parameters in one or more combustion cans of the combustor;
   generating, by the processing subsystem, a plurality of patterns based on a permutation entropy window and the signals;
   identifying, by the processing subsystem, a plurality of pattern categories in the plurality of patterns;
   determining, by the processing subsystem, a permutation entropy based on the plurality of patterns and the plurality of pattern categories, wherein determining the permutation entropy comprises:
   determining a number of patterns in each of the plurality of pattern categories;
   determining a plurality of relative occurrences of the plurality of pattern categories based on the number of patterns in each of the plurality of pattern categories and a total number of the plurality of patterns; and
   determining the permutation entropy based on the plurality of relative occurrences of the plurality of pattern categories and an embedding dimension of the permutation entropy window;
   predicting, by the processing subsystem, an anomaly in the combustor based on the permutation entropy;
   if the anomaly is present in the combustor then comparing, by the processing subsystem, the plurality of pattern categories to determined permutations of pattern categories; and
   predicting a category of the anomaly, by the processing subsystem, based on the comparison of the plurality of pattern categories to the determined permutations of pattern categories.

2. The method of claim 1, wherein identifying the plurality of pattern categories comprises grouping the plurality of patterns into the plurality of pattern categories based on amplitudes of data points corresponding to the plurality of patterns.

3. The method of claim 1, wherein the permutation entropy comprises a weighted permutation entropy.

4. The method of claim 3, wherein determining the permutation entropy comprises determining a weighted permutation entropy, and wherein determining the weighted permutation entropy comprises:
   assigning weights to the plurality of patterns based on a plurality of amplitudes of the signals; and
   determining the weighted permutation entropy based on the number of patterns in each of the plurality of pattern categories and the corresponding weights of the plurality of patterns.

5. The method of claim 4, wherein assigning the weights to the plurality of patterns comprises:
   determining a mean of amplitudes of data points corresponding to the plurality of patterns;
   determining a covariance of the amplitudes of the data points based on the mean of amplitudes; and
   assigning the covariance as the weight to the plurality of patterns.

6. The method of claim 1, wherein the category of the anomaly in the combustor comprises a lean blowout event, a rich blowout event, an instability in the combustor, or combinations thereof.

7. The method of claim 1, further comprising generating pre-processed signals, wherein generating the pre-processed signals comprises:
   receiving sensor-signals from one or more sensing devices;
   generating resampled signals by resampling and de-trending the sensor-signals; and
   generating the pre-processed signals by processing the resampled signals via a band-pass filter.

8. The method of claim 7, wherein receiving the signals representative of the parameters in the one or more combustion cans comprises receiving the sensor-signals from the one or more sensing devices, receiving the pre-processed signals, or a combination thereof.

9. A system for predicting an anomaly in a combustor, comprising:
   one or more sensing devices disposed on one or more combustion cans of the combustor and configured to generate sensor-signals representative of parameters in the one or more combustion cans of the combustor;
   a processing subsystem operatively coupled to the one or more sensing devices and configured to:
   pre-process the sensor-signals representative of parameters in the one or more combustion cans to generate pre-processed signals;
   generate a plurality of patterns based on a permutation entropy window and the pre-processed signals;
   identify a plurality of pattern categories in the plurality of patterns;
   determine a permutation entropy based on the plurality of patterns and the plurality of pattern categories;
   predict an anomaly in the combustor based on the permutation entropy;
   if the anomaly is present then compare the plurality of pattern categories to determined permutations of pattern categories;
   predict a category of the anomaly in the combustor based on the comparison of the plurality of pattern categories to the determined permutations of pattern categories; and
   wherein the processing subsystem is further configured to:
   determine a number of patterns in each of the plurality of pattern categories;
   determine a plurality of relative occurrences of the plurality of pattern categories based on the number of patterns in each of the plurality of pattern categories and a total number of the plurality of patterns; and
   determine the permutation entropy based on the plurality of relative occurrences of the plurality of pattern categories and an embedding dimension of the permutation entropy window.

10. The system of claim 9, wherein the processing subsystem is configured to group the plurality of patterns into the plurality of pattern categories based on amplitudes of data points corresponding to the plurality of patterns to identify the plurality of pattern categories.

11. The system of claim 9, wherein the processing subsystem is configured to predict the anomaly in the combustor by comparing the permutation entropy to a determined threshold, and wherein the determined threshold is a function of operating conditions of a gas turbine comprising the combustor.

12. The system of claim 9, wherein the permutation entropy comprises a weighted permutation entropy, and the processing subsystem is configured to:
assign weights to the plurality of patterns based on a plurality of amplitudes of the pre-processed signals; and
determine the weighted permutation entropy based on the number of patterns in each of the plurality of pattern categories and the corresponding weights of the plurality of patterns.

13. The system of claim 12, wherein the processing subsystem is configured to:
determine a mean of amplitudes of data points in the plurality of patterns;
determine a covariance of the amplitudes of the data points based on the mean of the amplitudes; and
assign the covariance as the weights to the plurality of patterns.

14. The system of claim 9, wherein the processing subsystem is configured to:
generate resampled signals by resampling and de-trending the sensor-signals; and
generate the pre-processed signals by processing the resampled signals via a band-pass filter.

15. The system of claim 9, wherein the category of the anomaly in the combustor comprises a lean blowout event, a rich blowout event, an instability in the combustor, or combinations thereof.

16. The system of claim 9, wherein the parameters comprise a dynamic pressure in the one or more combustion cans, a pressure in the combustion cans, temperature, a flame intensity, or combinations thereof.

17. The system of claim 9, wherein the one or more sensing devices comprise an acoustic sensor, a pressure sensor, a vibration sensor, a piezoelectric sensor, or combinations thereof.

18. A method for predicting an anomaly in a combustor, comprising:
receiving, by a processing subsystem, signals representative of parameters in one or more combustion cans of the combustor;
generating, by the processing subsystem, a plurality of patterns based on a permutation entropy window and the signals, and generating pre-processed signals, wherein generating the pre-processed signals comprises:
receiving sensor-signals from one or more sensing devices;
generating resampled signals by resampling and de-trending the sensor-signals; and
generating the pre-processed signals by processing the resampled signals via a band-pass filter;
identifying, by the processing subsystem, a plurality of pattern categories in the plurality of patterns;
determining, by the processing subsystem, a permutation entropy based on the plurality of patterns and the plurality of pattern categories;
predicting, by the processing subsystem, an anomaly in the combustor based on the permutation entropy;
if the anomaly is present in the combustor then comparing, by the processing subsystem, the plurality of pattern categories to determined permutations of pattern categories; and
predicting a category of the anomaly, by the processing subsystem, based on the comparison of the plurality of pattern categories to the determined permutations of pattern categories.

19. The method of claim 18, wherein identifying the plurality of pattern categories comprises grouping the plurality of patterns into the plurality of pattern categories based on amplitudes of data points corresponding to the plurality of patterns.

20. The method of claim 18, wherein the category of the anomaly in the combustor comprises a lean blowout event, a rich blowout event, an instability in the combustor, or combinations thereof.

21. The method of claim 18, wherein receiving the signals representative of the parameters in the one or more combustion cans comprises receiving the sensor-signals from the one or more sensing devices, receiving the pre-processed signals, or a combination thereof.

22. A system for predicting an anomaly in a combustor, comprising:
one or more sensing devices disposed on one or more combustion cans of the combustor and configured to generate sensor-signals representative of parameters in the one or more combustion cans of the combustor;
a processing subsystem operatively coupled to the one or more sensing devices and configured to:
pre-process the sensor-signals representative of parameters in the one or more combustion cans to generate pre-processed signals;
generate a plurality of patterns based on a permutation entropy window and the pre-processed signals, wherein the permutation entropy comprises a weighted permutation entropy, and the processing subsystem is configured to:
assign weights to the plurality of patterns based on a plurality of amplitudes of the pre-processed signals; and
determine the weighted permutation entropy based on the number of patterns in each of the plurality of pattern categories and the corresponding weights of the plurality of patterns;
identify a plurality of pattern categories in the plurality of patterns;
determine a permutation entropy based on the plurality of patterns and the plurality of pattern categories;
predict an anomaly in the combustor based on the permutation entropy;
if the anomaly is present then compare the plurality of pattern categories to determined permutations of pattern categories; and
predict a category of the anomaly in the combustor based on the comparison of the plurality of pattern categories to the determined permutations of pattern categories.

23. The system of claim 22, wherein the processing subsystem is configured to group the plurality of patterns into the plurality of pattern categories based on amplitudes of data points corresponding to the plurality of patterns to identify the plurality of pattern categories.

24. The system of claim 22, wherein the processing subsystem is configured to predict the anomaly in the combustor by comparing the permutation entropy to a determined threshold, and wherein the determined threshold is a function of operating conditions of a gas turbine comprising the combustor.

25. The system of claim 22, wherein the processing subsystem is configured to:
- determine a mean of amplitudes of data points in the plurality of patterns;
- determine a covariance of the amplitudes of the data points based on the mean of the amplitudes; and
- assign the covariance as the weights to the plurality of patterns.

26. The system of claim 22, wherein the processing subsystem is configured to:
- generate resampled signals by resampling and de-trending the sensor-signals; and
- generate the pre-processed signals by processing the resampled signals via a band-pass filter.

27. The system of claim 22, wherein the category of the anomaly in the combustor comprises a lean blowout event, a rich blowout event, an instability in the combustor, or combinations thereof.

28. The system of claim 22, wherein the parameters comprise a dynamic pressure in the one or more combustion cans, a pressure in the combustion cans, temperature, a flame intensity, or combinations thereof.

29. The system of claim 22, wherein the one or more sensing devices comprise an acoustic sensor, a pressure sensor, a vibration sensor, a piezoelectric sensor, or combinations thereof.

* * * * *